(12) United States Patent
Maddali et al.

(10) Patent No.: US 7,852,049 B2
(45) Date of Patent: Dec. 14, 2010

(54) DUAL CHANNEL POWER GENERATION SYSTEM

(75) Inventors: Vijay K Maddali, Rockford, IL (US); Gregory I Rozman, Rockford, IL (US); Matthew L Wilhide, Cherry Valley, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 503 days.

(21) Appl. No.: 12/106,304

(22) Filed: Apr. 20, 2008

(65) Prior Publication Data

US 2009/0261586 A1    Oct. 22, 2009

(51) Int. Cl.
*F02J 1/00*    (2006.01)
*F02N 11/04*    (2006.01)

(52) U.S. Cl. .......................... 322/46; 322/37
(58) Field of Classification Search .................. 322/22, 322/23, 24, 37, 46, 90
See application file for complete search history.

(56) References Cited

U.S. PATENT DOCUMENTS

| | | | | |
|---|---|---|---|---|
| 5,710,471 A | * | 1/1998 | Syverson et al. | 310/114 |
| 5,764,036 A | * | 6/1998 | Vaidya et al. | 322/90 |
| 6,373,230 B2 | * | 4/2002 | Jabaji | 322/28 |
| 6,504,346 B2 | * | 1/2003 | Nakamura et al. | 322/90 |
| 7,170,261 B2 | * | 1/2007 | Walter et al. | 322/8 |
| 7,420,826 B2 | * | 9/2008 | Tan et al. | 363/71 |
| 7,508,086 B2 | * | 3/2009 | Huang et al. | 290/31 |

\* cited by examiner

*Primary Examiner*—Nicholas Ponomarenko
(74) *Attorney, Agent, or Firm*—Stephen G. Mican

(57) ABSTRACT

A dual channel power generation system comprises: a prime mover; a permanent magnet (PM) dynamoelectric machine that has a PM rotor coupled to the prime mover, two multiphase alternating current (AC) stators that develop electromotive force (EMF) in response to rotation of the PM rotor due to the magnetic flux linkage between the PM rotor and the stators, two control coils that each change the magnetic flux linkage of a respective stator in response to the level of a control current that passes through the control coil; a multiphase AC rectifier for each stator that receives AC power from its respective stator to supply DC power on a respective rectifier bus; a current feedback loop for each rectifier bus; a voltage feedback loop for each rectifier bus; a load-sharing controller responsive to both current feedback loops to develop a voltage regulator reference signal for each rectifier bus that is representative of the value of voltage that its corresponding stator should produce to maintain equal values of current for both rectifier buses; and a voltage regulator for each rectifier bus responsive to its respective voltage feedback loop and voltage regulator reference signal to produce the control current for its respective control coil that changes the magnetic flux linkage of its respective stator to maintain the value of voltage that its corresponding stator should produce to maintain equal values of current for both rectifier buses.

12 Claims, 2 Drawing Sheets

DUAL CHANNEL POWER GENERATION SYSTEM

FIELD OF THE INVENTION

The invention relates to electrical power generation systems, and more particularly to electrical power generation systems with automatic regulation features.

BACKGROUND OF THE INVENTION

Electrical power generation systems powered by variable speed prime movers that require highly regulated electrical output, such as electrical power generation systems used for aeronautical applications, generally use a wound field synchronous machine (WFSM) that serves as an electrical generator. This is because it is easy to adjust rotor current to regulate electrical output of a WFSM. In aeronautical applications, the prime mover is often a gas turbine engine that has a normal rotational velocity that exceeds 20,000 revolutions per minute (rpm). Due to the rotational velocity limitations of the WFSM, such electrical power generation systems generally require a reduction gearbox between the prime mover and the WFSM. This increases weight, cost and complexity of the electrical power generation systems.

Electrical power generation systems may alternatively employ an electrical machine of the permanent magnet type as an electrical generator. Such a permanent magnet (PM) machine is capable of much higher rotational velocity than a WFSM of similar output and therefore it is capable of direct coupling to the prime mover, thereby eliminating the reduction gearbox. This results in reduced weight, cost and complexity of an electrical power generation system. However, traditional PM machines have no convenient means to alter magnetic flux for regulating their output.

An electrical power generation system may alternatively use a regulated PM machine that has a control coil. Current level in the control coil regulates EMF that the PM machine develops by changing the magnetic flux linkage between its rotor and stator. A control coil current regulator system senses electrical output potential on a direct current (DC) bus for the electrical power generation system and adjusts the current level in the control coil to regulate the DC bus voltage.

Particularly in aeronautical applications, it is sometimes desirable to design an electrical power generation system that employs a prime mover driven generator with two stator windings, each dedicated to a separate power generation channel that supplies a common power system bus for purposes of system redundancy. It is possible to construct regulated PM machines that have two stator windings, each with their own respective control coils. Therefore, it is desirable to have a dual channel power generation system that operates with such machines.

SUMMARY OF THE INVENTION

The invention generally comprises a dual channel power generation system comprising: a prime mover; a permanent magnet (PM) dynamoelectric machine that has a PM rotor coupled to the prime mover, two multiphase alternating current (AC) stators that develop electromotive force (EMF) in response to rotation of the PM rotor due to the magnetic flux linkage between the PM rotor and the stators, two control coils that each change the magnetic flux linkage of a respective stator in response to the level of a control current that passes through the control coil; a multiphase AC rectifier for each stator that receives AC power from its respective stator to supply DC power on a respective rectifier bus; a current feedback loop for each rectifier bus; a voltage feedback loop for each rectifier bus; a load-sharing controller responsive to both current feedback loops to develop a voltage regulator reference signal for each rectifier bus that is representative of the value of voltage that its corresponding stator should produce to maintain equal values of current for both rectifier buses; and a voltage regulator for each rectifier bus responsive to its respective voltage feedback loop and voltage regulator reference signal to produce the control current for its respective control coil that changes the magnetic flux linkage of its respective stator to maintain the value of voltage that its corresponding stator should produce to maintain equal values of current for both rectifier buses.

DETAILED DESCRIPTION OF THE INVENTION

Figure 1:
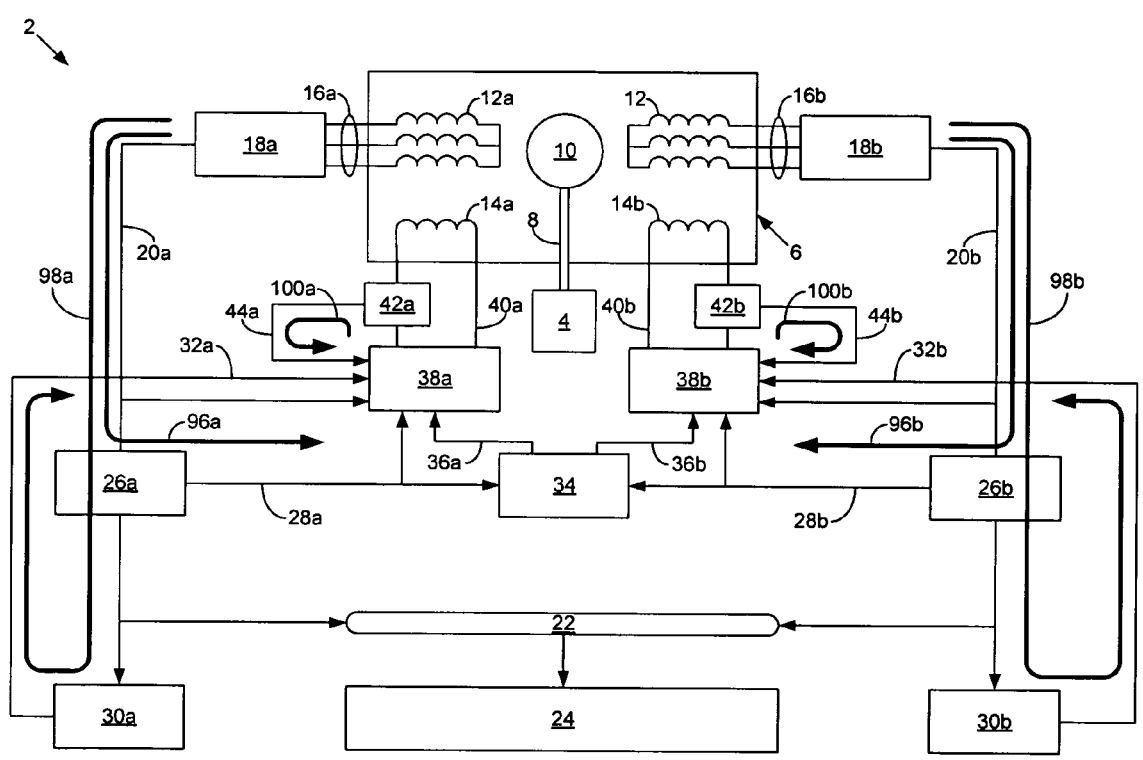
FIG. 1 is a high-level schematic representation of a dual channel electrical power generation system according to a possible embodiment of the invention.

FIG. 1 is a high-level schematic representation of a dual channel electrical power generation system 2 according to a possible embodiment of the invention. The system 2 comprises a prime mover 4, such as an aeronautical gas turbine engine, that drives a regulated dual-channel multiphase alternating current (AC) PM dynamoelectric machine 6 by way of a drive shaft 8. The machine 6 comprises a PM rotor 10 coupled to the drive shaft 8, two multiphase AC stators 12a and 12b proximate the PM rotor 10 and two control coils 14a and 14b, one for each of the stators 12a and 12b. Examples of PM machines with regulation of stator power output by means of a control coil are described in co-pending application Ser. Nos. 10/996,411 and 11/400,614, by Dooley, as well as 12/061,309 by Gieras et al., all of which this application incorporates by reference.

As the prime mover 4 rotates the PM rotor 10, it induces multiphase electromagnetic force (EMF) in the stators 12a and 12b that each stator 12a, 12b couples to a respective multiphase AC stator bus 16a, 16b. Each stator 12a, 12b has a respective multiphase AC rectifier 18a, 18b that receives AC power from its respective stator bus 16a, 16b and converts it to DC power on a respective rectifier bus 20a, 20b. A main DC power bus 22 may receive the DC power from each rectifier bus 20a, 20b. At least one DC electrical load 24 receives the DC power from the main DC power bus 22.

A rectifier bus current sensor 26a, 26b for each rectifier bus 20a, 20b measures the level of electrical current for the DC power on the rectifier bus 20a, 20b and generates a rectifier bus current feedback signal that is representative of the measured level on a respective rectifier bus current feedback signal line 28a, 28b. A rectifier bus voltage sensor 30a, 30b for each rectifier bus 20a, 20b measures the level of voltage for the DC power on the rectifier bus 20a, 20b and generates a rectifier bus voltage feedback signal that is representative of the measured level on a respective rectifier bus voltage feedback signal line 32.

A load-sharing controller 34 receives the rectifier bus current feedback signal from each rectifier bus current sensor 26a, 20b on its respective rectifier bus current feedback signal line 28a, 28b that represents the level of current for its respective rectifier bus 20a, 20b. Based on the level of the current feedback signals, it generates a voltage reference signal for each rectifier bus 20a, 20b on a respective voltage reference signal line 36a, 36b that is representative of the value of voltage that its corresponding stator 12 should produce to maintain equal values of current for both rectifier buses 20.

An voltage regulator 38a, 38b for each rectifier bus 20a, 20b receives the current feedback signal from its respective rectifier bus current sensor 26a, 26b on its respective rectifier bus current feedback signal line 28a, 28b and the rectifier bus voltage feedback signal from its respective rectifier bus voltage sensor 30a, 30b on its respective rectifier bus voltage feedback signal line 32a, 32b. It also receives the voltage reference signal for its respective rectifier bus 20a, 20b on its respective voltage reference signal line 36a, 36b. Each voltage regulator 38a, 38b uses DC power from its respective rectifier bus 20a, 20b to produce control current on a respective control current bus 40a, 40b that drives the control coil 14a, 14b associated with the stator 12a, 12b that supplies the rectifier bus 20a, 20b. Each voltage regulator 38a, 38b also has a control current sensor 42a, 42b that measures the level of control current for its associated control current bus 40a, 40b and generates a control current feedback signal on a respective control current feedback signal line 44a, 44b that is representative of the measured level.

Each voltage regulator 38a, 38b receives the current feedback signal for its associated control current sensor 42a, 42b on its respective control current feedback signal line 44a, 44b. In response to the received current feedback, voltage feedback, voltage reference, and control current feedback signals, each voltage regulator 38a, 38b modifies the level of control current for its associated control current bus 40a, 40b to a value that lets its respective control coil 14a, 14b regulate the voltage of its associated stator 12a, 12b to bring the voltage of its respective rectifier bus 20a, 20b to the value of the voltage reference signal on the voltage reference signal line 36a, 36 associated with the rectifier bus 20a, 20b. In this way, each rectifier bus 20a, 20b provides equal amounts of DC power to the main DC bus 22.

Figure 2:
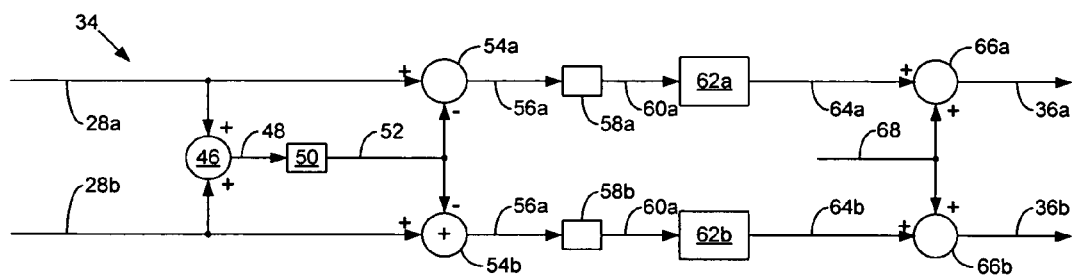
FIG. 2 is a schematic representation of a dual channel load-sharing controller for the power generation system in FIG. 1 according to a possible embodiment of the invention.

FIG. 2 is a schematic representation of the load-sharing controller 34 for the power generation system 2 in FIG. 1 according to a possible embodiment of the invention. The load-sharing controller 34 receives the rectifier bus current feedback signals associated with the rectifier buses 20a and 20b on the rectifier bus current feedback signal lines 28a and 28b. A current feedback signal summer 46 receives these rectifier bus current feedback signals and adds them to generate a current feedback summer signal on a current feedback summer signal line 48. Attenuator 50 receives the current feedback summer signal on the current feedback summer signal line 48 and attenuates the summer signal by a factor of 0.5 to produce an average current signal on an average current signal line 52.

Current feedback signal comparators 54a and 54b receive respective rectifier bus current feedback signals on associated rectifier bus current feedback signal lines 28a and 28b as well as the average current signal on the average current line 52 and compare their difference to produce current difference signals on respective current difference signal lines 56a and 56b. Inverters 58a and 58b receive respective current difference signals on associated current difference signal lines 56a and 56b to produce inverted current difference signals on respective inverted current difference signal lines 60a and 60b.

For purposes of system stability, lag functions 62a and 62b receive respective inverted current difference signals on their associated inverted current difference signal lines 60a and 60b to produce voltage difference bias signals on respective voltage bias signal lines 64a and 64b. The lag functions typically will be of the form $K/T_S+1$, wherein K is a gain constant and $T_s$ is a lag period. Alternatively, proportional-plus-integral (PI) functions may substitute for the lag functions 62a and 62b.

voltage signal summers 66a and 66b receive respective voltage difference bias signals on associated voltage bias signal lines 64a and 64b as well as a voltage reference signal on a voltage reference signal line 68 and combine them to produce respective voltage regulator reference signals on their associated voltage regulator reference signal lines 36a and 36b. The voltage regulator reference signals on the voltage regulator reference signal lines 36a and 36b control their associated voltage regulators 38a and 38b as hereinbefore described in connection with FIG. 1.

Figure 3:
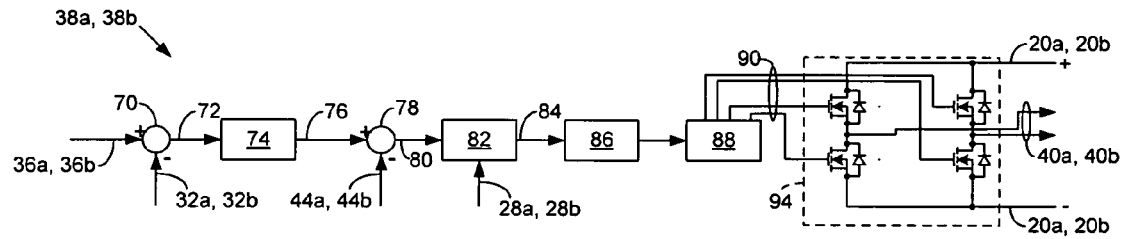
FIG. 3 is a schematic representation of a single one of the voltage regulators for the power generation system in FIG. 1 according to a possible embodiment of the invention.

FIG. 3 is a schematic representation of a single one of the voltage regulators 38a and 38b for the power generation system 2 in FIG. 1 according to a possible embodiment of the invention. An voltage comparator 70 receives the voltage regulator reference signal on its associated voltage regulator reference signal line 36a, 36b and the rectifier bus voltage feedback signal on its associated rectifier bus voltage feedback signal line 32a, 32b and compares the difference in these signals to produce a voltage difference signal on a voltage difference signal line 72.

A PI regulator 74 receives the voltage difference signal on the voltage difference signal line 72 to produce a control current reference signal on a control current reference signal line 76. A control current comparator 78 receives the control current reference signal on the control current reference signal line 76 and the control current feedback signal on its associated control current feedback signal line 44a, 44b and compares their difference to produce a control current difference signal on a control current difference signal line 80.

A variable gain PI regulator 82 receives the control current difference signal on the control current difference signal line 80 and its variable gain input receives the rectifier bus current feedback signal on its associated rectifier bus current feedback signal line 28a, 28b to produce a control current regulating signal on a control current regulating signal line 84. A pulse width modulator (PWM) circuit 86 receives the control current regulating signal on the control current regulating signal line 84 and generates corresponding PWM control signals on a PWM control signal bus 88. A gate drive circuit 90 receives the PWM control signals on the PWM control signal bus 88 and generates corresponding gate drive signals on a gate drive signal bus 92. An H-bridge circuit 94 receives the gate drive signals on the gate drive signal bus 90 as well as DC power on its associated rectifier bus 20a, 20b to produce the control current on its respective control current bus 40a, 40b that drives the control coil 14a, 14b associated with the stator 12a, 12b that supplies the rectifier bus 20a, 20b.

Referring back to FIG. 1, the load-sharing controller 34 thus develops the voltage regulator reference signals on respective voltage regulator reference signal lines 36a and 36b whose levels react to the current levels of the respective rectifier buses 20a and 20b by way of respective rectifier bus current feedback loops represented by arrows 96a and 96b. The voltage regulators 38a and 38b develop the control current for respective control coils 14a and 14b through respective control current buses 40a and 40b and change the level of the control current in response to the voltage levels of the respective rectifier buses 20a and 20b by way of respective rectifier bus voltage feedback loops represented by arrows 98a and 98b. The variable gain characteristic the voltage regulators 38a and 38b whose gain changes in proportion to sensed current level on their respective rectifier buses 20a and 20b improves stability of the system 2 over its range of current levels. The response of the voltage regulators 38a and 38b to the control current through their respective control current buses 40a and 40b as represented by respective control current feedback loops 100a and 100b improve dynamic performance of voltage regulation by the system 2.

The described embodiments of the invention are only some illustrative implementations of the invention wherein changes and substitutions of the various parts and arrangement thereof are within the scope of the invention as set forth in the attached claims.

The claimed invention is:

1. A dual channel power generation system comprising:
   a prime mover;
   a permanent magnet (PM) dynamoelectric machine that has a PM rotor coupled to the prime mover, two multiphase alternating current (AC) stators that develop electromotive force (EMF) in response to rotation of the PM rotor due to the magnetic flux linkage between the PM rotor and the stators, two control coils that each change the magnetic flux linkage of a respective stator in response to the level of a control current that passes through the control coil;
   a multiphase AC rectifier for each stator that receives AC power from its respective stator to supply DC power on a respective rectifier bus;
   a current feedback loop for each rectifier bus;
   a voltage feedback loop for each rectifier bus;
   a load-sharing controller responsive to both current feedback loops to develop a voltage regulator reference signal for each rectifier bus that is representative of the value of voltage that its corresponding stator should produce to maintain equal values of current for both rectifier buses; and
   a voltage regulator for each rectifier bus responsive to its respective voltage feedback loop and voltage regulator reference signal to produce the control current for its respective control coil that changes the magnetic flux linkage of its respective stator to maintain the value of voltage that its corresponding stator should produce to maintain equal values of current for both rectifier buses.

2. The system of claim 1, further comprising a control current feedback loop for each control coil, wherein each respective voltage regulator is responsive to its control current feedback loop to increase dynamic voltage regulation.

3. The system of claim 1, wherein each voltage regulator has a variable gain characteristic and whose gain changes in proportion to the current level through its respective rectifier bus to improve stability of the system over its range of current levels.

4. The system of claim 1, wherein each rectifier bus current feedback loop comprises a rectifier bus current sensor that measures the level of electrical current for the DC power on its respective rectifier bus and generates a rectifier bus current feedback signal that is representative of the measured level.

5. The system of claim 1, wherein each rectifier bus voltage feedback loop comprises a rectifier bus voltage sensor that measures the level of voltage for the DC power on its respective rectifier bus and generates a rectifier bus voltage feedback signal that is representative of the measured level.

6. The system of claim 2, wherein each control current feedback loop comprises a control current sensor that measures the level of control current for its respective control coil and generates a control current feedback signal that is representative of the measured level.

7. A dual channel power generation system comprising:
   a prime mover;
   a permanent magnet (PM) dynamoelectric machine that has a PM rotor coupled to the prime mover, two multiphase alternating current (AC) stators that develop electromotive force (EMF) in response to rotation of the PM rotor due to the magnetic flux linkage between the PM rotor and the stators, two control coils that each change the magnetic flux linkage of a respective stator in response to the level of a control current that passes through the control coil;
   a multiphase AC rectifier for each stator that receives AC power from its respective stator to supply DC power on a respective rectifier bus;
   a rectifier bus current sensor for each rectifier bus that measures the level of electrical current for the DC power on its respective rectifier bus and generates a rectifier bus current feedback signal that is representative of the measured level;
   a rectifier bus voltage sensor for each rectifier bus that measures the level of voltage for the DC power on its respective rectifier bus and generates rectifier bus voltage feedback signal that is representative of the measured level;
   a load-sharing controller responsive to both rectifier bus current feedback signals to develop a voltage regulator reference signal for each rectifier bus that is representative of the value of voltage that its corresponding stator should produce to maintain equal values of current for both rectifier buses; and
   a voltage regulator for each rectifier bus responsive to its respective rectifier bus voltage feedback signal and voltage regulator reference signal to produce the control current for its respective control coil that changes the magnetic flux linkage of its respective stator to maintain the value of voltage that its corresponding stator should produce to maintain equal values of current for both rectifier buses.

8. The system of claim 7, further comprising a control current sensor for each control coil that measures the level of control current for its respective control coil and generates a control current feedback signal that is representative of the measured level, wherein each respective voltage regulator is responsive to its respective control current feedback signal to increase dynamic voltage regulation.

9. The system of claim 7, wherein each voltage regulator has a variable gain characteristic and whose gain changes in proportion to the current level through its respective rectifier bus to improve stability of the system over its range of current levels.

10. A dual channel power generation system comprising:
    a prime mover;
    a permanent magnet (PM) dynamoelectric machine that has a PM rotor coupled to the prime mover, two multiphase alternating current (AC) stators that develop electromotive force (EMF) in response to rotation of the PM rotor due to the magnetic flux linkage between the PM rotor and the stators, two control coils that each change the magnetic flux linkage of a respective stator in response to the level of a control current that passes through the control coil;
    a multiphase AC rectifier for each stator that receives AC power from its respective stator to supply DC power on a respective rectifier bus;

a rectifier bus current sensor for each rectifier bus that measures the level of electrical current for the DC power on its respective rectifier bus and generates a rectifier bus current feedback signal that is representative of the measured level;

a rectifier bus voltage sensor for each rectifier bus that measures the level of voltage for the DC power on its respective rectifier bus and generates rectifier bus voltage feedback signal that is representative of the measured level;

a control current sensor for each control coil that measures the level of control current for its respective control coil and generates a control current feedback signal that is representative of the measured level;

a load-sharing controller responsive to both rectifier bus current feedback signals to develop a voltage regulator reference signal for each rectifier bus that is representative of the value of voltage that its corresponding stator should produce to maintain equal values of current for both rectifier buses; and a voltage regulator with a variable gain characteristic for each rectifier bus responsive to its respective control current feedback signal, rectifier bus voltage feedback signal and voltage regulator reference signal to produce the control current for its respective control coil that changes the magnetic flux linkage of its respective stator to maintain the value of voltage that its corresponding stator should produce to maintain equal values of current for both rectifier buses, whose gain is responsive to the rectifier bus current feedback signal for its respective rectifier bus.

11. The system of claim 10, wherein the load-sharing controller comprises:

a current feedback signal summer that receives the rectifier bus current feedback signals and adds them to generate a current feedback summer signal;

an attenuator that receives the current feedback summer signal and attenuates the summer signal by a factor of 0.5 to produce an average current signal;

two current feedback signal comparators that receive respective rectifier current feedback signals as well as the average current signal compare their difference to produce current difference signals;

two inverters that receive respective current difference signals to produce inverted current difference signals;

two lag functions that receive respective inverted current difference signals to produce voltage difference bias signals; and voltage signal summers that receive respective voltage difference bias signals as well as a voltage reference signal and combine them to produce the respective voltage regulator reference signals.

12. The system of claim 10, wherein each voltage regulator comprises:

a voltage comparator that receives its respective voltage regulator reference signal and its respective rectifier bus voltage feedback signal and compares the difference in these signals to produce a voltage difference signal;

a PI regulator that receives the voltage difference signal to produce a control current reference signal;

a control current comparator that receives the control current reference signal and its respective control current feedback signal and compares their difference to produce a control current difference signal;

a variable gain proportional-plus-integral (PI) regulator that receives the control current difference signal and its variable gain input receives its respective rectifier bus current feedback signal to produce a control current regulating signal;

a pulse width modulator (PWM) circuit that receives the control current regulating signal and generates corresponding PWM control signals;

a gate drive circuit that receives the PWM control signals and generates corresponding gate drive signals; and an H-bridge circuit that receives the gate drive signals to produce the control current that drives its respective control coil associated with the stator that supplies its respective rectifier bus.

* * * * *